Feb. 12, 1957 W. J. BLACK 2,781,227
AUTO INSECT DEFLECTOR
Filed June 12, 1953 2 Sheets-Sheet 1
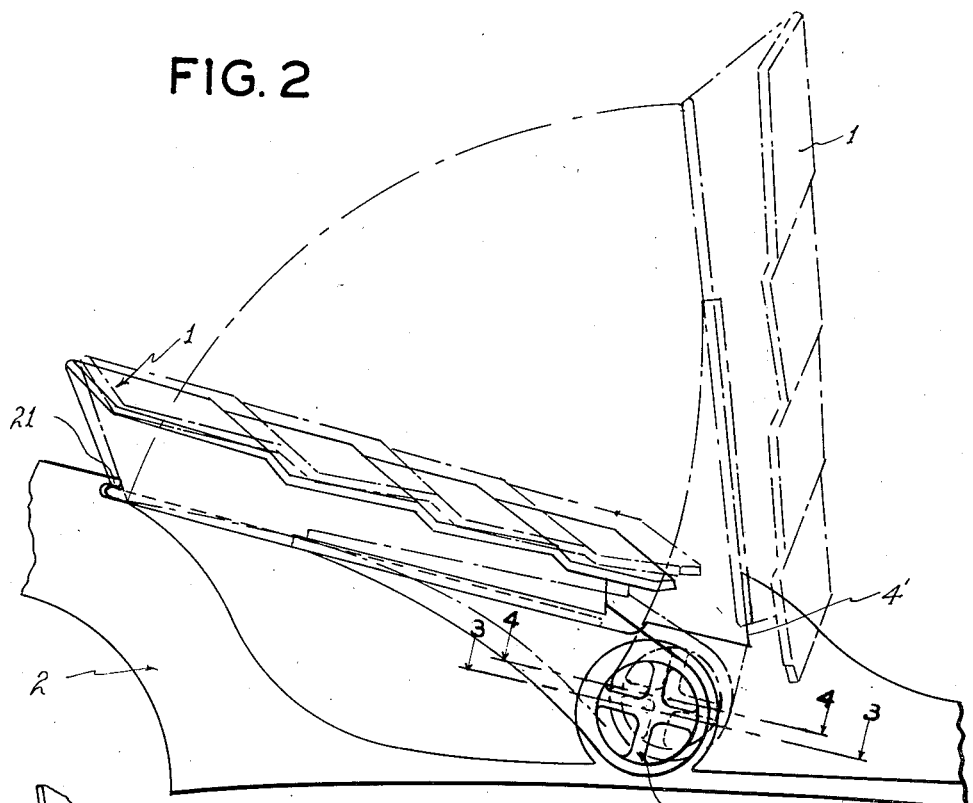
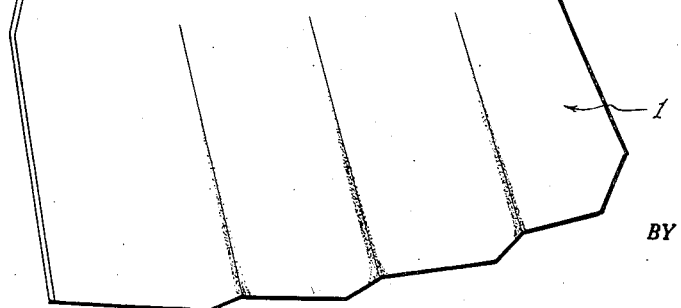
INVENTOR.
WILLIAM J. BLACK
BY
his ATTORNEY

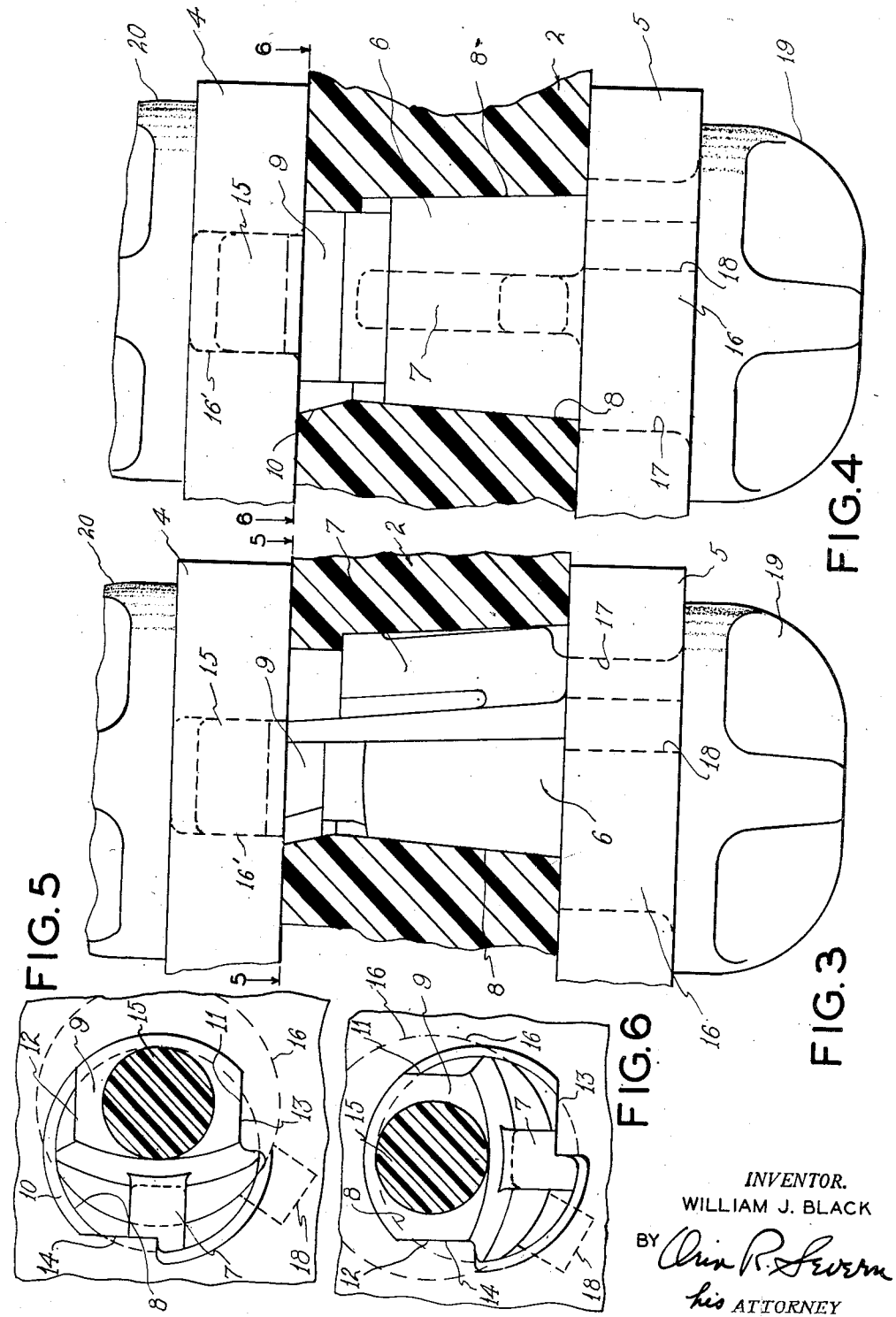

United States Patent Office 2,781,227
Patented Feb. 12, 1957

2,781,227
AUTO INSECT DEFLECTOR

William J. Black, Chatham, N. J., assignor to Curtiss-Wright Corporation, a corporation of Delaware Application June 12, 1953, Serial No. 361,231

6 Claims. (Cl. 296—91)

My invention relates to an insect deflector for maintaining the windshield of an automobile free of insects, etc., and more particularly to an insect deflector of the type having a deflecting vane which is operable at moderate speeds of the car from a substantially flat inoperative position on the car hood to a deflecting operative position by means of aerodynamic pressure.

Insect deflectors of the vane type are usually mounted on a car hood near the front and may comprise a transparent vane positioned transversely of the direction of motion so that at ordinary driving speeds the air stream is deflected above the hood and windshield along the top of the car thus carrying with it light air borne particles such as insects, snow, etc. At normal driving speeds this deflecting action is sufficient to keep the windshield comparatively clean. A common disadvantage, however, of the ordinary vane deflector is that it has a fixed position on the hood and does not harmonize with the streamlining of the modern car and therefore serves no useful purpose when not in operation. This disadvantage may be overcome by the use of an insect deflector of the type shown and described in a copending application for Letters Patent, Serial No. 284,400, filed April 25, 1952 by Roy T. Hurley and assigned to the same assignee as the present invention, wherein the vane is shown as pivotally mounted on the car hood so as to normally lie flat and blend with the hood design when the car is stationary or moving slowly, but is operated by aerodynamic pressure to a deflecting position and held in such position when the car reaches a moderate speed as, for example, 25 miles per hour.

My present invention is an improvement on the deflector of said copending application in that the transparent vane while operable from a substantially flat or nondeflecting position on the hood, which it assumes when the car is stationary or driven slowly, to a deflecting position at moderate speeds may, when in a flat position on the hood, be adjusted longitudinally to a locked position and in its locked position the vane is prevented from assuming a deflecting position regardless of the speed of the car. In accordance with my invention, this locking feature is built into the insect deflector and being inherent in its construction, the use of additional locking devices, catches or the like is avoided. Because of the adjustability of the vane to a locked position achieved by my invention, the driver may be provided with the optimum visibility when, for example, the air is relatively free of insects, etc., and there is little necessity for the deflector vane assuming an operative position; and a more pleasing appearance is maintained at such times.

It is an object of my invention to provide an insect deflector having a vane operable from a substantially flat or non-deflecting position on the hood of an automobile to a deflecting position by aerodynamic pressure wherein the vane may be moved longitudinally when in its flat position to a locked position on the car hood by a simple adjustment of the pivot pin serving as a pivotal axis for the vane.

This invention will be more fully set forth in the following description referring to the accompanying drawings, and the features of novelty which characterize the invention will be pointed out with particularity in the claims annexed to and forming a part of this specification.

Referring to the drawings Fig. 1 is a top plan view of an insect deflector constructed in accordance with my invention. Fig. 2 is a side elevational view of the insect deflector showing the vane both in a locked and unlocked position on the hood ornament and in a deflecting position. Fig. 3 is an enlarged sectional view taken on the plan of the line 3—3 of Fig. 2 with the vane in a locked position on the hood ornament. Fig. 4 is an enlarged sectional view taken of the plan of the line 4—4 of Fig. 2 with the vane in an unlocked position on the hood ornament. Fig. 5 is a sectional view taken on the plan of the line 5—5 of Fig. 3. Fig. 6 is a sectional view taken on the plan of the line 6—6 of Fig. 4.

Referring to Figs. 1 and 2 of the drawings, reference character 1 designates a transparent vane which is pivotally mounted on a supporting member 2 by means of a turnable pivot pin 3 extending through arms 4 and 5 which are integral parts of the vane and through supporting member 2. Supporting member 2 may be designed as a hood ornament and may be either permanently attached to an automobile hood as standard equipment or provided with suitable fastening means (not shown) for securing the ornament to the hood as, for example, along the conventional chrome center strip. As stated, the vane is pivotally mounted on supporting member 2 by means of pin 3, and the vane is free to rotate about the pin (through an angle somewhat less than 90° from a relatively flat or inoperative position on the supporting member) providing the vane is in an unlocked position. The movement of the vane is limited by a stop 4' found on the hood ornament and located so that the vane tends to fall into its substantially flat or inoperative position if not supported by aerodynamic pressure. Preferably the vane is designed to resemble the wing structure of a bird so as to form part of the hood ornament as illustrated in Fig. 2. The vane has a slight "angle of attack" in its flat inoperative position so that it is forced upwardly to its deflecting position by aerodynamic pressure when an automobile having the deflector mounted thereon is moved at a predetermined velocity as for example 25 miles per hour. The vane is, of course, held in its deflecting position at a lower velocity than that required to lift the vane from its low angle of attack position so that there is no tendency for the vane to "chatter" at marginal speeds.

As shown (Figs. 3–6 inclusive) pivot pin 3 includes a tapered portion 6 and an integral member 7 oppositely disposed from portion 6. Portion 6 and member 7 are rotatably mounted in a tapered opening 8 in supporting member 2. The pin is formed of a plastic material having characteristics such that member 6 can function as though resiliently hinged thereto, and the pin is so constructed that member 7 would project slightly more outwardly from portion 6 if the pin were withdrawn from its inserted position as illustrated in the drawings. Accordingly in the inserted position of the pin, portion 6 and member 7 are in firm contact with the wall of opening 8 and a snug fit is thereby provided for the pin in the supporting member 2. As will become apparent hereinafter member 7 serves to lock the pivot pin in its inserted position and prevent its accidental dislodgement from the deflector. The pin 3 includes a portion 9 that registers in a flared out end 10 of opening 8 and is formed with side walls 11 and 12 to engage stops 13 and 14 in the flared out end 10 of opening 8 for limiting the turning of the pivot pin to a quarter of a turn.

The pin also includes cylindrical portions 15 and 16 which register in openings 16′ and 17 respectively provided in the arms of the deflector vane. Cylindrical portions 15 and 16 are eccentric to the other portions of the pin that register in opening 8 and serve to impart a longitudinal movement to the vane when the pin is rotated in a clockwise or counterclockwise direction. A suitable slot 18 is provided in one arm 5 of the deflector vane to permit the pivot pin to be removed from the deflector or reinserted therein after its removal, the slot 18 being adapted to receive member 7 which will register therein when the pin is aligned with the slot. Obviously, with the pin in its inserted position and member 7 out of alignment with slot 18, member 7 of the pin serves to lock the pin in place and prevent accidental dislodgment thereof. Pin 3 is provided with a ribbed button-type head 19 at one end for appearance sake and to facilitate turning the pivot pin. Another similar ribbed button-type head 20 is integrally formed on arm 4 opposite from head 19 so as to provide a symmetrically appearing structure.

As shown, supporting member 2 has an overhanging lip 21 which locks the vane in position on the supporting member in a forward position. In the forward position of the vane in which position stop 13 is engaged by wall 11, lip 21 overlies the bottom edge of the vane to prevent the vane from pivoting about the pin. It is merely necessary to turn the pivot pin 3 a quarter of a turn in a clockwise direction as viewed in Fig. 2 of the drawing and until wall 12 engages stop 14 to unlock the vane by moving it out from under lip 21 and provide for its deflection when sufficient aerodynamic pressure is exerted against its underside as occasioned by the relative motion by the vane and surrounding air. In order to move the vane into its locked position under lip 21, the pivot pin is turned a quarter of a turn in a counterclockwise direction.

Preferably the supporting member or hood ornament 2, the vane 4 and pin 3 are all formed from a suitable plastic material in the interest of providing a deflector which is light in weight and can be easily and economically manufactured and wherein by reason of the inherent nature of the material member 7 hereinbefore referred to behaves as though resiliently hinged to the pivot pin.

It will now be apparent that I have provided an insect deflector which, while having a vane operable by aerodynamic pressure from a substantially flat or non-deflecting position at moderate speeds to a deflecting position can, if desired, be securely locked in position on the hood ornament by merely turning the pivot pin which serves as a pivotal axis for the vane, and that the structure for obtaining the desired results has a neat and attractive appearance, there being no necessity for the use of additional locking devices, catches or the like since the locking feature is inherent in the construction itself.

What is claimed is:

1. An insect deflector for a vehicle comprising a vane-like deflector structure, a supporting member for the deflector structure, a turnable pivot pin inter-connecting the supporting member and deflector structure to provide a pivotal axis for the deflector structure, the deflector structure having a normal resting position on the supporting member at an acute angle to the horizontal, but swingable about the pivot pin through an angle to a deflecting position by aerodynamic pressure against the underside thereof, means for limiting the extent of the swinging movement, the pivot pin having at least one eccentric portion for causing translational movement of the deflector structure while in said non-deflecting position to a forward position or to a retracted position on the supporting member upon turning the pivot pin in one direction or the other, and means for locking said deflector on the supporting member in one of said forward or retracted positions.

2. An insect deflector for a vehicle comprising a vane-like deflector structure having a pair of arms each with an opening extending therethrough, a supporting member for the deflector structure with at least a portion thereof disposed between said arms and having an opening extending therethrough, a turnable pivot pin extending through the openings in the supporting member and said arms to provide a pivotal axis for the deflector structure, the deflector structure having a normal resting position on the supporting member at an acute angle to the horizontal, but swingable about the pivot pin through an angle to a deflecting position by aerodynamic pressure against the underside thereof, means for limiting the extent of the swinging movement, the pivot pin having a tapered portion in the opening in said supporting member and having other portions eccentric thereto in the openings in the deflector arms for causing translational movement of the deflector structure when in said non-deflecting position to a forward position or to a retracted position on the supporting member upon turning the pivot pin in one direction or the other, and means for locking said deflector on the supporting member in one of said forward or retracted positions.

3. An insect deflector for a vehicle comprising a vane-like deflector structure having off-set structure with an opening extending therethrough, a supporting member for the deflector structure with at least a portion thereof having an opening extending therethrough, a turnable pivot pin extending through the openings in the supporting member and said structure to provide a pivotal axis for the deflector structure, the deflector structure having a normal rest position on the supporting member at an acute angle to the horizontal, but swingable about the pivot pin through an angle to a deflecting position by aerodynamic pressure against the underside thereof, means for limiting the extent of the swinging movement, the pivot pin having a tapered portion in the opening in said supporting member including a resiliently hinged member to assure a tight fit for the pin in said supporting member and having other portions in the openings in the deflector structure eccentric to the tapered portion for causing translational movement of the deflector structure when in said non-deflecting position to a forward position or a retracted position on the supporting member upon turning the pivot pin in one direction or the other, and means for locking said deflector on the supporting member in one of said forward or retracted positions.

4. An insect deflector for a vehicle comprising a vane-like deflector structure having a pair of arms each with an opening extending therethrough, a supporting member for the deflector structure with at least a portion thereof disposed between said arms and having an opening extending therethrough tapered for at least a portion of its length, a turnable pivot pin extending through the openings in the supporting member and said arms to provide a pivotal axis for the deflector structure, the deflector structure having a normal rest position on the supporting member at an acute angle to the horizontal, but swingable about the pivot pin through an angle to a deflecting position by aerodynamic pressure against the underside thereof, means for limiting the extent of the swinging movement, the pivot pin having a tapered portion disposed in the tapered portion of the opening in said supporting member and including a resiliently hinged member to assure a tight fit for the pin in said supporting member, and having other portions in the openings in the deflector arms eccentric to the tapered portion for causing translational movement of the deflector structure when in said non-deflecting position to a forward position or a retracted position on the supporting member upon turning the pivot pin in one direction or the other, and means for locking said deflector on the supporting member in one of said forward or retracted positions, said supporting member including stops in the opening extending therethrough, and the pivot pin being formed to engage said stops at predetermined positions of the pivot pin thereby defining limiting positions to which the pin may be turned.

5. An insect deflector for a vehicle comprising a vane-like deflector structure having a pair of arms each with an opening extending therethrough, a supporting member for the deflector structure with at least a portion thereof disposed between said arms and having an opening extending therethrough tapered for at least a portion of its length, a turnable pivot pin extending through the openings in the supporting member and said arms to provide a pivotal axis for the deflector structure, the deflector structure having a normal rest position on the supporting member at an acute angle to the horizontal, but swingable about the pivot pin through an angle to a deflecting position by aerodynamic pressure against the underside thereof, means for limiting the extent of the swinging movement, the pivot pin having a tapered portion disposed in the tapered portion of the opening in said supporting member and including a resiliently hinged member to assure a tight fit for the pin in said supporting member, and having other portions in the openings in the said arms eccentric to the tapered portion for causing translational movement of the deflector structure when in said non-deflecting position to a forward or a retracted position on the supporting member upon turning the pivot pin in one direction or the other, and means for locking said deflector on the supporting member in one of said forward or retracted positions, said supporting member including stops in the opening extending therethrough and the pivot pin being formed to engage said stops at predetermined positions of the pivot pin thereby defining limiting positions to which the pin may be turned, the deflector arm on the diverging side of said tapered opening having a slot in the opening extending therethrough permitting removal and insertion of the pivot pin when the said resilient arm is aligned with the slot.

6. An insect deflector for a vehicle comprising a vane-like deflector structure of plastic material, a supporting member for the deflector structure, a plastic turnable pivot pin extending through the supporting member and deflector structure to provide a pivotal axis for the deflector structure, the deflector structure having a normal rest position on the supporting member at an acute angle to the horizontal, but swingable about the pivot pin through an angle to a deflecting position by aerodynamic pressure against the underside thereof, means for limiting the extent of the swinging movement, the pivot pin having a tapered portion extending through the supporting member and including a resiliently hinged member to assure a tight fit for the pin in the supporting member, and having other portions extending through the deflector structure eccentric to the tapered portion to effect movement of the deflector structure when in said non-deflecting position to a forward or a retracted position on the supporting member upon turning the pivot pin in one direction or the other, and means for locking said deflector on the supporting member in one of said forward or retracted positions.

References Cited in the file of this patent

UNITED STATES PATENTS

| | | |
|---|---|---|
| 305,125 | Williams | Sept. 16, 1864 |
| 1,401,734 | Roberts | Dec. 27, 1921 |
| 1,755,630 | Budde | Apr. 22, 1930 |
| 1,949,183 | Roberts | Feb. 27, 1934 |
| 2,049,360 | Erickson | July 28, 1936 |
| 2,112,709 | Reynolds | Mar. 29, 1938 |
| 2,302,672 | Buckley | Nov. 24, 1942 |
| 2,537,362 | Mattoon | Jan. 9, 1951 |